Figure 1:
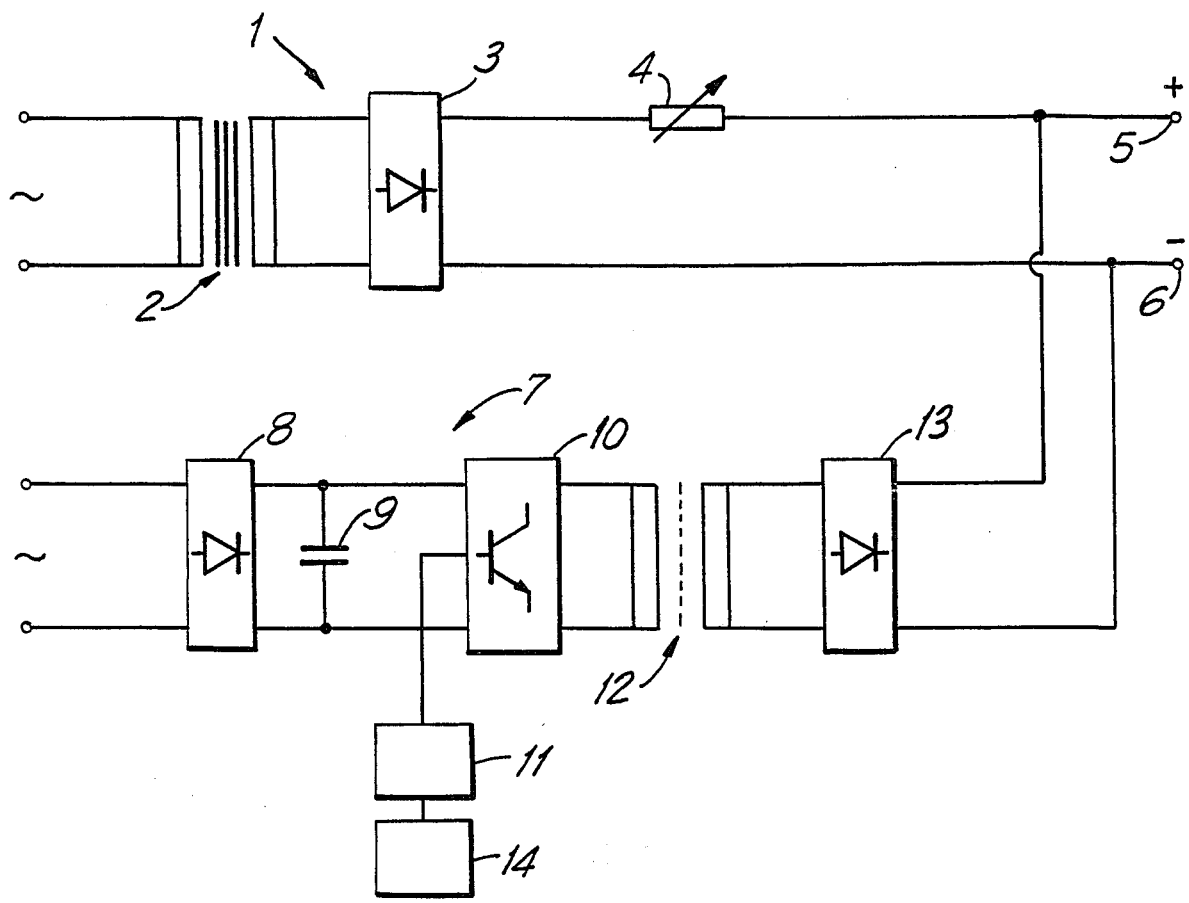

United States Patent [19]

Simm

[11] Patent Number: 4,751,367
[45] Date of Patent: Jun. 14, 1988

[54] ARRANGEMENT FOR THE GENERATION OF A WELDING CURRENT HAVING A D.C. PORTION AND SUPERIMPOSED CURRENT PULSES

[75] Inventor: Wolfgang Simm, Ecublens, Switzerland

[73] Assignee: Castolin S.A., St. Sulpice, Switzerland

[21] Appl. No.: 23,815

[22] Filed: Mar. 9, 1987

[30] Foreign Application Priority Data

Mar. 7, 1986 [CH] Switzerland ............................ 943/86

[51] Int. Cl.$^4$ ................................................ B23K 9/09
[52] U.S. Cl. .............................. 219/130.51; 219/137 PS
[58] Field of Search ....................... 219/130.51, 137 PS

[56] References Cited

U.S. PATENT DOCUMENTS

| | | | |
|---|---|---|---|
| 3,249,735 | 5/1966 | Needham | 219/130.51 |
| 3,538,301 | 11/1970 | Bray et al. | 219/130.51 |
| 3,588,465 | 6/1971 | Anderson et al. | 219/130.51 |
| 3,902,037 | 8/1975 | Goto et al. | 219/130.51 |
| 4,009,365 | 2/1977 | Kalev et al. | 219/130.51 |

FOREIGN PATENT DOCUMENTS 376387 11/1984 Austria .
2922634 12/1980 Fed. Rep. of Germany .

*Primary Examiner*—Clifford C. Shaw
*Attorney, Agent, or Firm*—Hopgood, Calimafde, Kalil, Blaustein & Judlowe

[57] ABSTRACT

The present arrangement comprises a welding current generator for the generation of a d.c. portion of the desired welding current, as well as a pulse current source, the output circuits of which are connected in parallel with one another to the output terminals of the arrangement. The pulse current source is of the type having a high-frequency transformer in association with control means connected at the primary side thereof and delivers current pulses from a series of high-frequency pulses with a high no-load peak voltage. This enables pulsed welding currents to be generated in an extremely economical way by the employment of existing d.c. welding generators together with small, relatively low-cost additional equipment.

2 Claims, 1 Drawing Sheet

ARRANGEMENT FOR THE GENERATION OF A WELDING CURRENT HAVING A D.C. PORTION AND SUPERIMPOSED CURRENT PULSES

The invention relates to an arrangement for the generation of a welding current which consists of a d.c. portion and current pulses superimposed upon the same.

Welding currents of such a form have proved advantageous in various applications and have been provided by special welding current sources which were relatively large generators supplying the whole welding power and having suitable control devices for the achievement of a desired waveform.

It has also been proposed to supply current pulses from a large welding current generator and to superimpose the same upon a d.c. component provided by a separate d.c. generator.

In all these cases a voluminous and costly special equipment was required to obtain a welding current of the kind referred to initially. In particular, when superimposing pulses from a pulse current welding generator upon a d.c. of another generator, the output voltage of the pulse generator has to be substantially higher than the output voltage of the d.c. generator and consequently, it was generally recognized that a high power pulse generator was necessary to obtain the desired welding current.

On the other hand, in many workshops d.c. welding generators of usual construction and adequate power are available. But hitherto it was not possible to use such d.c. generators for providing d.c. welding currents with superimposed current pulses.

The main object of the invention is to provide an arrangement which allows in an extremely economical way, in particular by making use of existing d.c. welding generators, to generate welding currents comprising a basic d.c. component and superimposed current pulses.

The invention starts out from the surprising recognition that under certain conditions it is possible to superimpose welding current pulses upon the d.c. of an ordinary welding current generator by using a pulse current source of comparatively low power and accordingly low cost.

In accordance with the invention, an arrangement for the generation of welding currents of the kind referred to initially comprises a welding current generator for the generation of said d.c. portion and a pulse current source, respective output circuits of said welding current generator and of said current source being connected in parallel with one another to output terminals of the arrangement, said pulse current source comprising a mains voltage source, a first rectifier circuit connected thereto, control means connected between said first rectifier circuit and a primary winding of a transformer for providing current pulses of a relatively high repetition frequency to said primary winding, a secondary winding of said transformer being connected through a second rectifier circuit to said output terminals, the arrangement being dimensioned so that the no-load output voltage pulse height of said pulse current source is higher than the no-load output voltage of said welding current generator.

The repetition frequency of the current pulses is generally between 1 and 100 kHz, preferably in the ultrasonic range or at least below 50 kHz. The arrangement according to the invention is particularly useful in arc welding with fusible coated hand-electrodes, or with wire electrodes, in particular with solid wire electrodes or filled wire electrodes, as well as in WIG or TIG welding and in plasma welding. Welding methods of these kinds using the present arrangement are also an object of the invention.

The invention is explained in greater detail below with the aid of the description of an embodiment, in which further features and advantages of the invention will be recognized by one skilled in the art.

FIG. 1 of the attached drawing shows diagrammatically the structure of the arrangement according to the invention.

An oridinary d.c. welding generator 1 is represented diagrammatically in the form of a transformer 2 in the secondary circuit of which lies a recitifer circuit 3. For the regulation of the output current an adjustable resistor 4 is indicated in the output circuit. Other usual embodiments of welding generators may however be employed, for example, generators with leakage field transformer, with thyristor rectifier circuits and so on. Generally, existing d.c. generators of suitably high power which are usually fed from threephase mains, for example, at 380 V, are employed and provide a direct current at output terminals 5, 6.

A pulse current source as used in the arrangement in accordance with the invention is designated in FIG. 1 as a whole by 7. Such a pulse current source is likewise fed from the mains, which can here be the 220 V single-phase mains. A first rectifier circuit 8 charges an electrolytic capacitor 9 and feeds a transistor control circuit 10 which is itself controlled by a control device 11. The transistor circuit 10 is made so that it delivers to the primary winding of a transformer 12 current pulses of a frequency lying preferably in the ultrasonic field, for example, of 25 kHz, the keying ratio being less than 50%, for example, about 45%. The secondary winding of transformer 12 is connected to a rectifier circuit 13 and the output terminals of said rectifier circuit 13 are connected to the output terminals 5, 6 of the welding current generator 1, i.e., the output circuits of said welding current generator and of said pulse current source are connected in parallel with one another. The control device 11 of the pulse current source 7 is connected to a regulating device 14 by which in particular the amplitude or the course of the amplitudes of the voltage pulses at the output of the transistor control circuit 10, as well as their repetition frequency and keying ratio, and also the repetition frequency of a pulse series or the occurence thereof may be determined.

The present arrangement thus delivers at its output terminals 5, 6 on the one hand a d.c. component of desired magnitude generated by the generator 1 and on the other hand a desired pulse current component which originates from the source 7. A pulse current source of which use is made here is described, for example, in Austrian Patent No. 3 76 387.

The particularly of a pulse current source of this type is that it delivers no-load output voltage pulses of a relatively great height while the keying ratio is less than 50% and can be substantially less. Accordingly, the power of such a pulse current source can be relatively small, although it still allows, thanks to the the high peak voltage, to superimpose the pulse component upon the d.c. portion of the welding current. In practice, the main part of the necessary welding power can be provided by said d.c. portion and a comparatively small power of the pulse component allows to obtain the essential advantages of the pulsed operating method. As an exemple, the no-load peak voltage of the pulse current source 7 is about 90 V, the no-load voltage of the d.c. generator 1 is about 55 V, the short-circuit currents being 200 A and 500 A, respectively.

If the actual working point during welding is at about 90 A, the power provided by the d.c. welding generator corresponds to a d.c. voltage of 46 V, while the additional pulse voltage is only of about 8 V. The superimposed welding current pulses are each obtained after rectificaton from a series of high-frequency voltage pulses, of for example a repetition frequency of 25 kHz appearing at the terminals of the secondary winding of transformer 12, and they can occur for example at a repetition frequency of from 0.1 to 25 Hz, or up to 200 Hz. Those welding current impulses can also be triggered individually. Depending on the welding method employed, the height, the shape, the duration of the welding current pulses or impulses can be determined by the control means 10, 11, 14 which in particular allow to adjust the repetition frequency and keying ratio of the high-frequency voltage pulses from which said current pulses are obtained.

The invention is of considerable economic importance since existing d.c. generators may be employed for welding with pulsed welding currents by using the same together with a noticeably smaller and cheaper apparatus. Furthermore, such an additional apparatus may be made as an independent welding current source and may therefore be versatile in use. The present arrangement may in a particularly advantageous way be employed in the case of arc welding with wire electrodes which may be made as filled wire electrodes or solid wire electrodes, in which case, for example, the known MIG or MAG methods may be applied.

Further important fields of application are arc welding with hand-electrodes as well as welding with non-fusible electrodes according to the WIG or TIG method, and plasma welding.

I claim:

1. An arrangement for the generation of welding currents which consist of a d.c. portion and current pulses superimposed upon said d.c. portion, comprising a welding current generator for the generation of said d.c. portion and a pulse current source, respective output circuits of said welding current generator and of said current source being connected in parallel with one another to output terminals of the arrangement, said pulse current source comprising a mains voltage source, a first rectifier circuit connected thereto, control means connected between said first rectifier circuit and a primary winding of a transformer for providing current pulses characterized by a repetition frequency of between 1 kHz and 100 kHz to said primary winding, a secondary winding of said transformer being connected through a second rectifier circuit to said output terminals, the arrangement being dimensioned so that the no-load output voltage pulse height of said pulse current source is higher than the no-load output voltage of said welding current generator and that the current pulses obtained after rectification at said output terminals have repetition frequency of between 0.1 to 25 Hz.

2. The arrangement of claim 1,
    wherein said pulse current source which comprises said mains voltage source,
    and said first rectifier circuit connected thereto and control means connected between said first rectifier circuit and primary winding of said transformer with the secondary winding thereof connected through said second rectifier circuit to output terminals,
is structured as a welding current generator to enable the use thereof independent of said welding current generator used for the generation of said d.c. portion of the current.

* * * * *